Nov. 8, 1932.  A. H. NELSON  1,886,896
CAN POSITIONING AND FEEDING MACHINE
Filed July 21, 1930    6 Sheets-Sheet 1
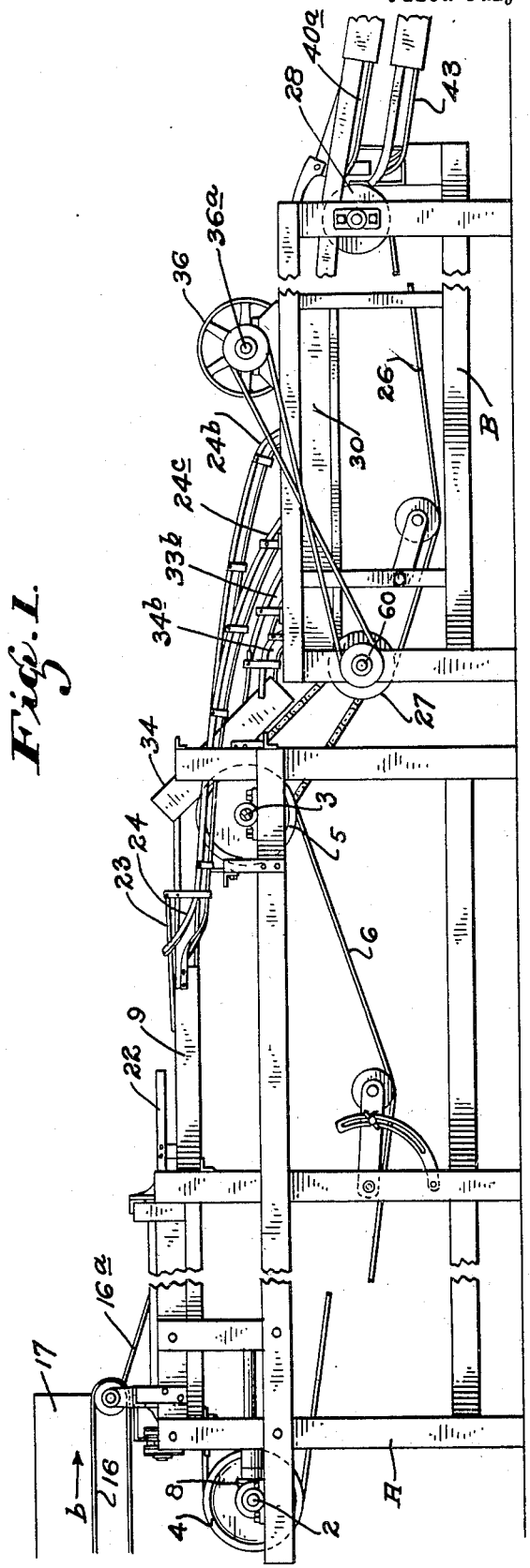
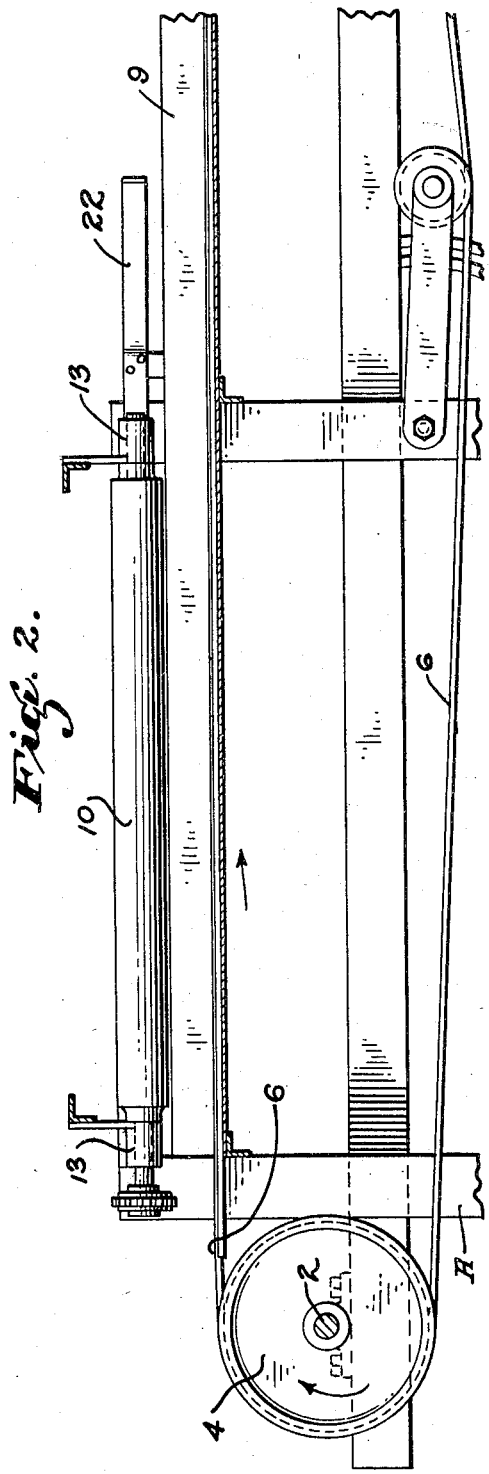
INVENTOR.
Adolf H. Nelson.
BY
Townsend, Loftus & Abbett
ATTORNEYS.

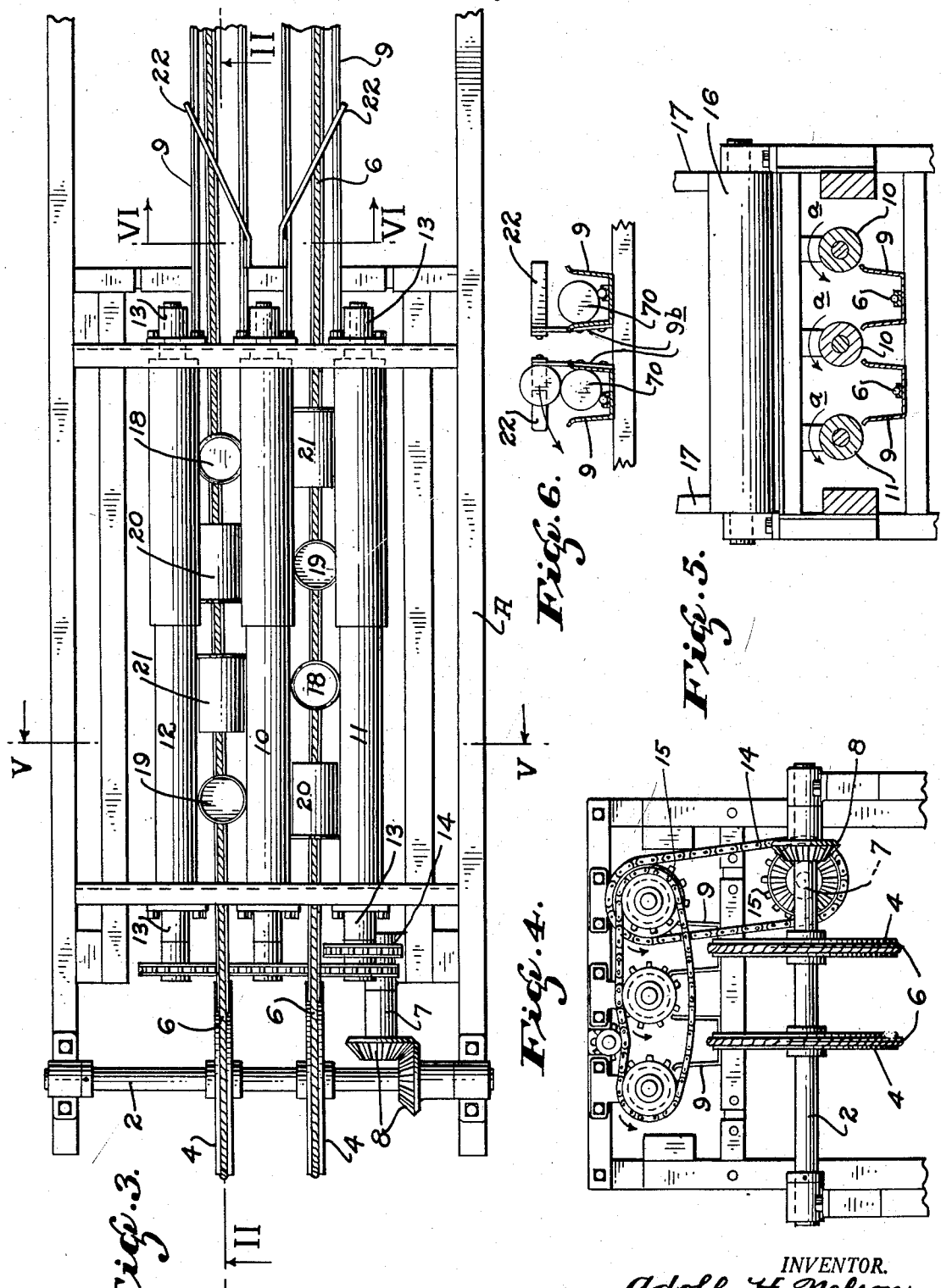

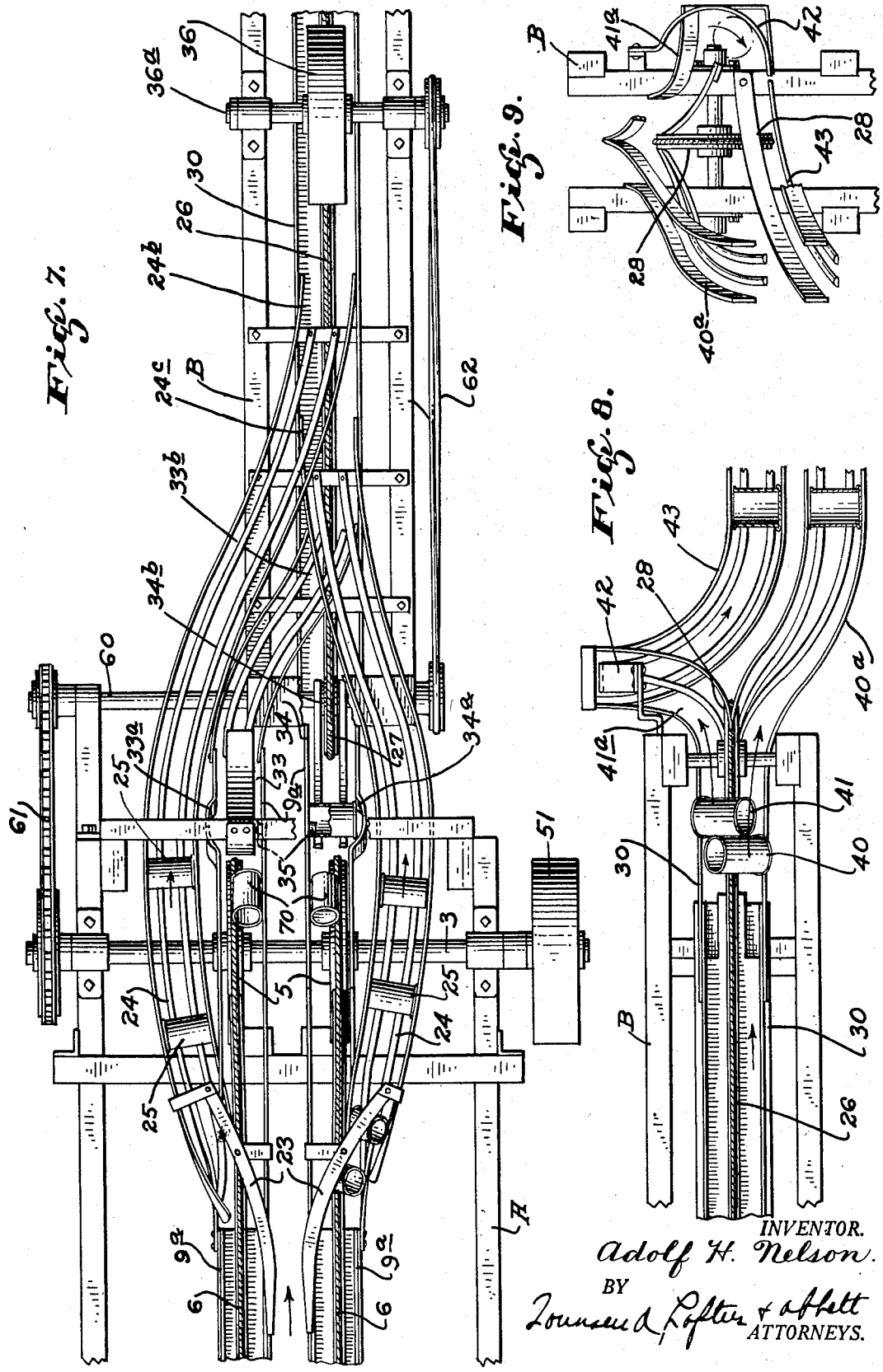

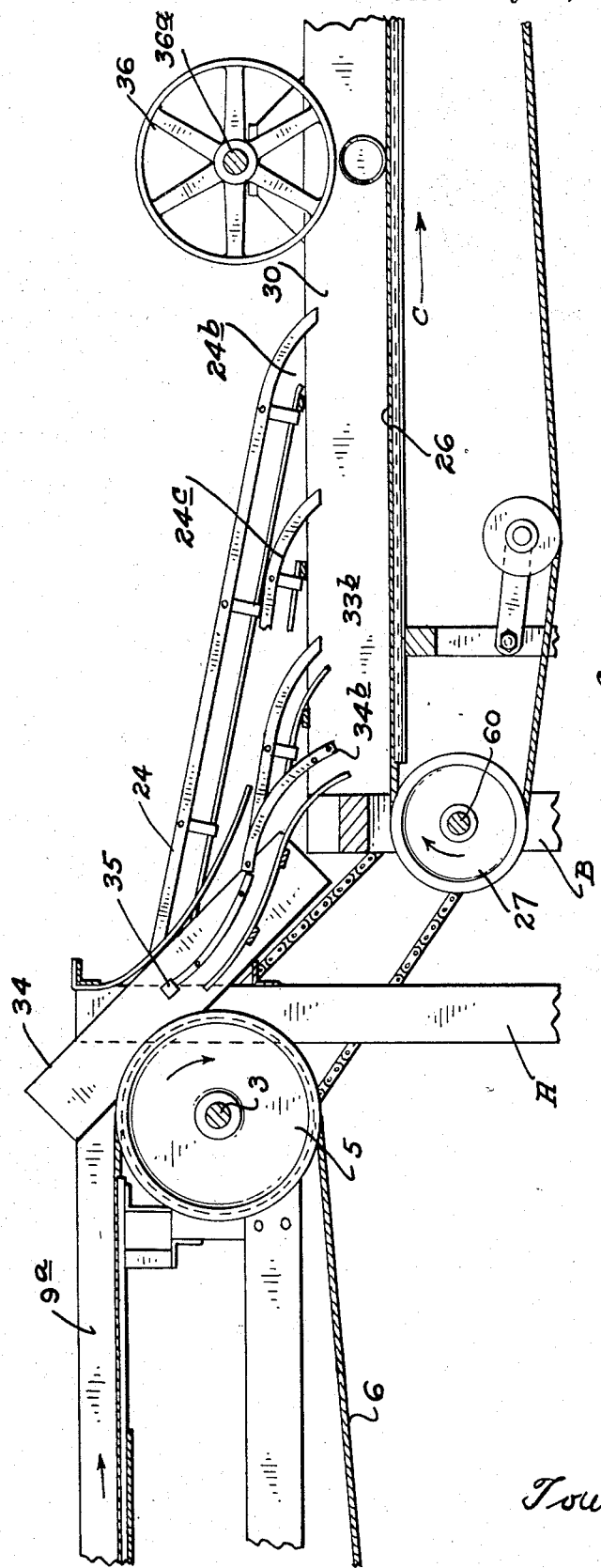

Nov. 8, 1932.   A. H. NELSON   1,886,896
CAN POSITIONING AND FEEDING MACHINE
Filed July 21, 1930   6 Sheets-Sheet 5
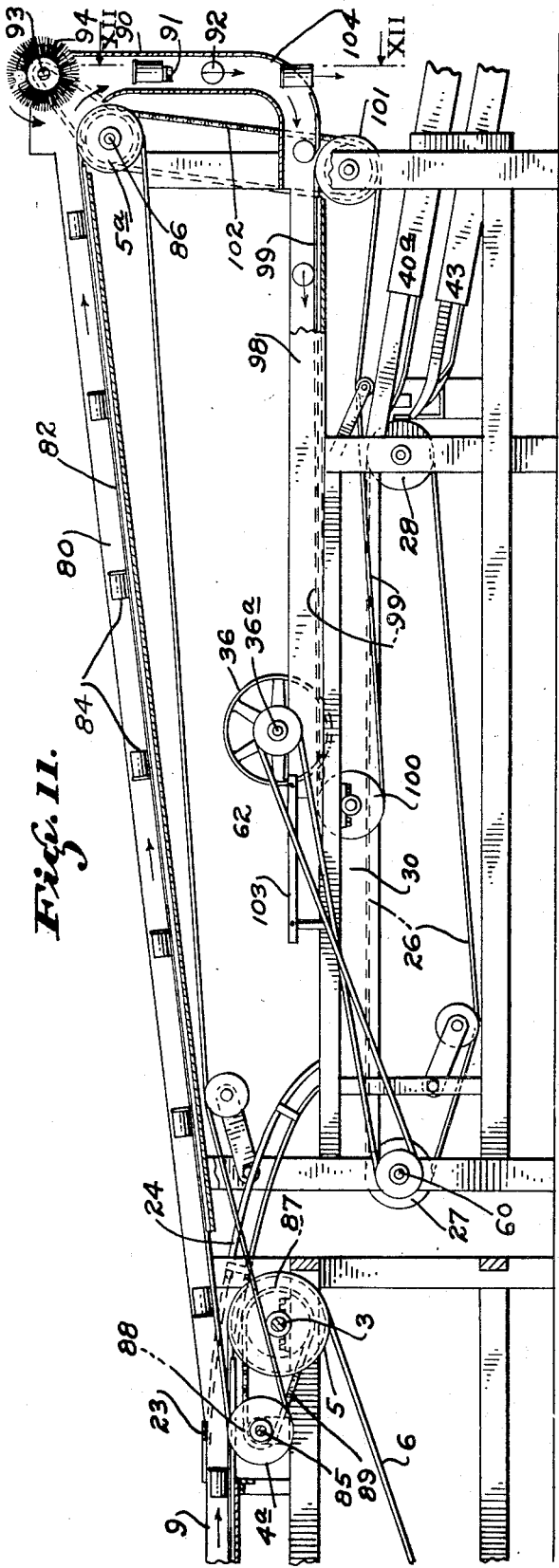
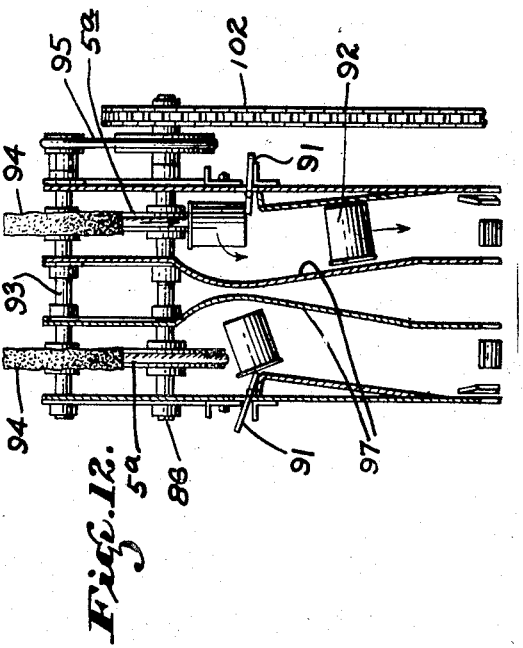
INVENTOR.
Adolf H. Nelson.
BY Townsend, Loftus & Abbett
ATTORNEYS.

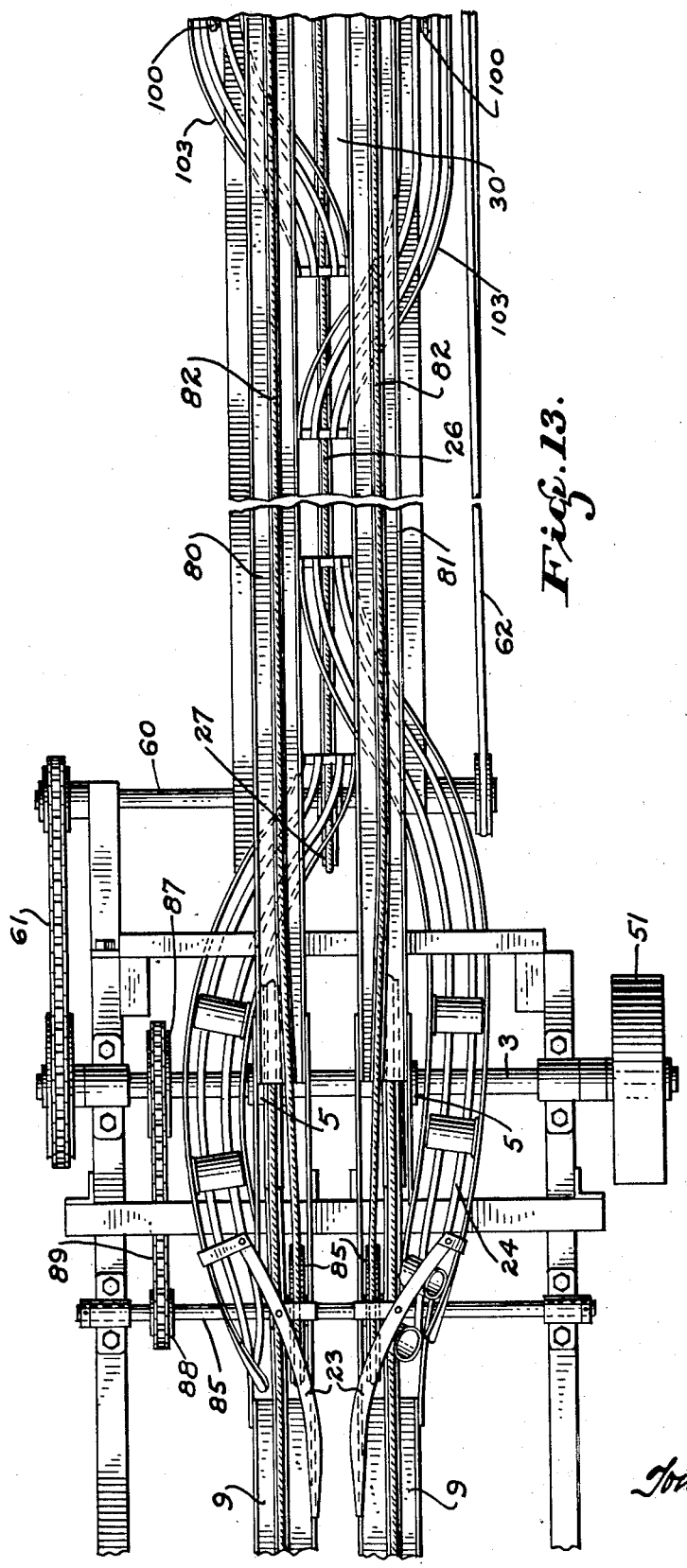

Patented Nov. 8, 1932

1,886,896

UNITED STATES PATENT OFFICE

ADOLF H. NELSON, OF SAN FRANCISCO, CALIFORNIA

CAN POSITIONING AND FEEDING MACHINE

Application filed July 21, 1930. Serial No. 469,383.

This invention relates to a can feeding machine, and particularly to a machine which will arrange the cans in an orderly or predetermined position before discharging them.

In canneries where several lines of can machinery are in operation cans must be delivered to each line at the rate of eighty or more per minute. The empty cans usually arrive at the canneries in large wooden crates and one or more operators are required for each line to remove the cans and place them on the feeding belts of the respective lines.

The object of the present invention is to provide a can positioning and feeding machine capable of delivering cans to one or more lines; to provide a machine of this character which requires only one operator; and further, to provide a machine into which whole crates of cans may be dumped promiscuously and from which they will be discharged in an orderly or predetermined position ready for delivery to the feeding belts of one or more can machinery lines.

The machine, briefly stated comprises a hopper into which the cans are dumped, a conveyor for removing the cans therefrom, means for arranging the cans in an orderly or predetermined position, and means for delivering the cans in said predetermined position to one or more feeding belts.

The can positioning and feeding machine is shown by way of illustration in the accompanying drawings, in which—

Fig. 1 is a side elevation of the machine,

Fig. 2 is an enlarged longitudinal vertical section taken on line II—II of Fig. 3, Fig. 3 is a plan view of the rollers whereby the cans are first positioned, Fig. 4 is an end view of Fig. 3, Fig. 5 is a cross section taken on line V—V of Fig. 3, Fig. 6 is a cross section taken on line VI—VI of Fig. 3, Fig. 7 is a plan view of that part of the positioning mechanism whereby the cans are arranged with their longitudinal axis at right angles to their path of travel, Fig. 8 is a plan view of the discharge end of the machine, Fig. 9 is an end view of Fig. 8, Fig. 10 is a side elevation partially in section of Fig. 7.

Fig. 11 shows a modified form of the mechanism whereby the horizontally disposed cans on the conveyor belt 6, which pass under the guides 23, are positioned before delivery to the conveyor 26, Fig. 12 is an enlarged vertical section taken on line XII—XII of Fig. 11, and Fig. 13 is a large plan view of the front portion of the modified structure shown in Fig. 11.

Referring to the drawings in detail and particularly Figs. 1 to 5, inclusive, A indicates a main frame at opposite ends of which are journaled shafts 2 and 3. Secured to each shaft are a pair of pulleys 4—4 and 5—5 and carried by the pulleys are endless cables 6. The cables travel in troughs extending longitudinally of the frame such as indicated at 9—9 and three rollers are disposed above the troughs, one centrally between them as indicated at 10, and the other two are disposed on opposite sides as indicated at 11 and 12. These rollers extend a substantial distance and are supported at their opposite ends in bearings 13. They are furthermore driven in unison and in the same direction as indicated by the arrows $a$, see Figs. 4 and 5, and this drive is transmitted from a shaft 7 through sprockets and chains as shown at 14 and 15 respectively.

The cans to be positioned are dumped directly from the crates onto a conveyor belt 16 which travels in the direction of arrow $b$, see Fig. 1. The cans when so dumped are piled up promiscuously one on top of the other and to prevent them from rolling or falling off the sides of the belt sideboards 17 or similar guards are provided. With cans deposited on the conveyor 16 and with the conveyor traveling in the direction of arrow $b$, the cans will be deposited on top of the rollers 10, 11 and 12 and as these rollers are all rotating in one direction the cans will drop downwardly between them and will be deposited in the troughs 9. They may here assume any one of four positions. One of two vertical positions, either with the bottom up as indicated at 18, or with the open end up as indicated at 19, or they may assume one or another of two horizontal positions, either with the open end pointing in the direction of travel of the cables 6 as indicated at 20, or with the bottom end pointing in the direction of travel as indicated at 21. Again it is possible that a few cans will pile on top of the cans indicated at 18, 19, 20 and 21, but such cans will be removed by deflector plates 22 as the cans are advanced between the rollers. The cans, thus removed, may be deposited in a gravity chute or a transverse conveyor belt, not here shown, to be returned to the conveyor 16.

The cans, assuming one of the four positions shown in Fig. 3, advance from between the rollers 10, 11 and 12 and the vertically positioned cans indicated at 18 and 19 are removed at the end of the conveyor cables 6—6 are approached. This is best illustrated in Figs. 7 and 10. The troughs 9—9 end at the point indicated at 9a and a pair of inclined arms 23 extend across the troughs at this point. These arms are disposed at a certain elevation with relation to the troughs so as to permit horizontally positioned cans, such as shown at 20 and 21, to pass under. At the same time vertically positioned cans, such as shown at 18 and 19, are engaged and removed being deflected by the arms 23 outwardly into inclined gravity chutes such as indicated at 24. The ends of the chutes 24 adjacent the inclined arms 23 are inclined or slightly twisted to conform to the arms 23 so that when the vertically disposed cans engage the arms 23 they will be gradually tilted and as they enter the chutes 24 they will become completely tilted from a vertical to a horizontal position and they will run down the chutes in a horizontal position with their longitudinal axis at right angles to the chutes as indicated at 25.

The troughs or chutes 9, together with the conveyor cables 6 co-operating therewith, will hereinafter be referred to as the first conveyor as they are identical in construction. A second conveyor in the form of a cable is shown at 26, see Figs. 1, 7 and 10. This conveyor cable is supported by pulleys 27 and 28 journaled at opposite ends of a frame B. The conveyor cable 26 travels in a trough or chute 30 but the cable is elevated with relation to the bottom of the chute for purposes hereinafter to be described. The chutes 24 terminate at different points as shown at 24b and 24c, see Fig. 10, which illustrates the chute 30, and the vertical cans which have been removed from the conveyor cables 6 are thus delivered to the conveyor cable 26 in a horizontal position and with their longitudinal axis at right angles to the direction of travel of the conveyor 26.

The horizontal cans carried by the conveyor cables 6, as previously stated, pass under the inclined arms 23 and are delivered to gravity chutes 33 and 34. In these chutes are turning pins such as indicated at 35. The cans in sliding down the chutes strike the pins 35 and the opposite end of each can will accordingly swing around and cause the cans to assume a horizontal position at right angles to their path of travel, the chutes being bulged out as indicated at 34a and 33a to permit turning of the cans when engaging the pins 35. The chutes 33 and 34 also terminate at different points as shown at 33b and 34b so as to deposit the cans on the conveyor 26. The termination of the several chutes at different points such as shown in Fig. 10 is of considerable importance as it tends to eliminate any piling up of the cans, but if they should happen to pile up, they are engaged by a pulley 36, see Fig. 10, and are thereby spread so as to present a single layer of cans as they advance through the chute or trough 30.

The cans are now traveling in the direction of arrow c along the trough 30 and all the cans are arranged horizontally with their axis at right angles to the path of travel. The open ends of the cans are, however, pointing in different directions and as it is desired to discharge all the cans with their open ends pointing in the same direction means must be provided for separating the cans having their open ends pointing in one direction with relation to the cans which have their open ends pointing in the opposite direction. This is accomplished as follows:

It was previously stated that conveyor cable 26 was maintained in a slightly elevated position with relation to the bottom of the trough 30. By so maintaining the cable in an elevated position the horizontally disposed cans arranged transversely of the chute will be maintained in an inclined position and as the open ends of the cans are the lightest the open ends will point upwardly as shown at 40 and 41, see Fig. 8. With the cans so positioned it is only necessary to discharge the cans 40 into the chute indicated at 40a and to discharge the cans indicated at 41 into a chute indicated at 41a. This chute is looped-shaped as indicated at 42, see Fig. 9, and by passing the cans around the loop their position will be reversed end for end and they will finally discharge into the chute 43 with their open ends turned in the same direction as the cans discharging through the chute 40a. The cans are now discharging in the same position, that is, with their open ends pointing in one direction and they may now be delivered to the feeding belts of the respective lines, this being accomplished by discharging the cans directly on said feeding belts or to intermediate mechanisms, not shown.

The conveyors indicated at 6 and 26 and the rollers indicated at 10, 11 and 12 are all driven from a common source, to-wit, a drive shaft indicated at 3, see Fig. 7, this shaft being driven through pulley 51 in any suitable manner. The pulleys 5 and 5 are secured on this shaft and accordingly transmit power to drive the conveyor cables 6 and also the shaft indicated at 2. This shaft in turn transmits power through the bevel gears 8 to the shaft 7 and this in turn transmits power to the rollers 10, 11 and 12 through the sprocket gears and chains indicated at 14 and 15. Power is transmitted to the conveyor cable 26 through an intermediate shaft 60. This is driven from shaft 3 through a chain 61. Shaft 60 in turn transmits power to the conveyor belt 26 as the pulley 27 is secured to the shaft 60, and belt 62 transmits power to shaft 36a which supports the pulley 36 whereby piling up of the cans on the conveyor is prevented.

If reference is made to Figs. 3 and 7, it will be noted that the pulleys 5 are spaced further apart than the pulleys 4. This causes the conveyor cables 6 to travel at a slight angle with relation to the troughs 9. That is, the cables are closer to one side of said troughs at one end and they are closer to the opposite sides of the troughs at the opposite ends thereof. This is important for two reasons: First, it gives maximum traction to the vertically disposed cans at the point where they are engaged by the deflector arms 23; secondly, it causes the horizontally disposed cans to roll to opposite sides of the troughs 9 as shown at 70 in Figs. 6 and 7, that is, they roll to the sides of the troughs indicated at 9a which carries the pins 35, thus insuring engagement between the ends of the cans and the pins 35 as they slide down the chutes 33 and 34. Engagement between the cans and the side walls 9a carrying the pins 35 is of further importance as cans of different sizes are handled at different times. That is, the cans may vary both in diameter and in length and to take care of this feature it will be noted, by referring to Fig. 3, that the rollers 10, 11 and 12 are stepped.

Only two steps are shown in the present instance but more steps may be employed by lengthening the rollers. If the largest size cans are being handled, the cans are deposited from the conveyor 16 to that portion of the rollers which presents the smallest diameter and the moment they strike these rollers they drop between them and down into the troughs 9 where they are carried forward by the cables 6. On the other hand, if cans of smaller diameter are being handled an attachable bridging plate will be placed above the small diameter of the rollers as shown at 16a, that is, as the cans are moved from between the side walls 17 by the conveyor 16 they are dropped on the inclined plate 16a and this will then deliver the cans to a point on the rollers 10, 11 and 12 where they present their greatest diameter and they will here drop between the rollers into the trough and will be carried forwardly as previously described. Of course, it is also possible to mount the rollers 11 and 12 in bearings 13 which are adjustable laterally of the frame. By such adjustment the rollers may be spaced to or away from each other and cans of different diameter can be handled.

Figs. 11 to 13, inclusive, show a modified form of the mechanism whereby the horizontally disposed cans on the conveyor belts 6 are properly positioned before delivery to the conveyor belt 26. In this form of the mechanism, 3 indicates the shaft which carries the pulleys 5—5 and 6 indicates one of the conveyor belts and 9 one of the troughs through which the cans travel. It has been previously stated that the cans assume either an upright or a horizontal position while passing through the troughs 9. The upright cans are engaged by the guide members 23 and are tipped over and delivered to the chutes 24 which in turn deliver the cans to the trough 30 and the conveyor 26. The horizontally positioned cans will, in this instance, pass under the guide 23 and will be delivered to troughs indicated at 80 and 81. Conveyors 82 travel in these troughs and these conveyors travel at a comparatively high speed so as to increase the spacing between the cans shown at 84 in Fig. 11.

The conveyor belts 82 are supported by pairs of pulleys 4a and 5a, the pulleys 4a being secured on a shaft 85 disposed transversely of the machine, while the pulleys 5a are secured on the shaft 86 disposed transversely of the machine. Shaft 85 is driven from shaft 3, see Figs. 11 and 13, through sprockets 87 and 88 and chain 89, the sprocket 87 being large and the sprocket 88 small so as to transmit high speed to the conveyors 82. That is, the speed is at least double that of the conveyors 6 so that when the cans are transferred from the troughs 9 into the troughs 80 the spacing between the cans is at least doubled. The troughs 80 incline in an upward direction and they discharge into vertical chutes indicated at 90, see Figs. 11 and 12. The inner walls of these chutes are each provided with a pivotally mounted turning pin 91 and as the cans drop endwise down the vertical chutes 90 they strike the turning pins 91 and are thereby turned at right angles as indicated at 92. A shaft 93 is journaled crosswise of the machine just above the shaft 86. This shaft carries two brushes such as indicated at 94. These rotate at high speed as shaft 93 is driven from shaft 86 through the belt drive indicated at 95, as the cans reach the upper end of the troughs 80 they are engaged by the brushes 94 and as these rotate at a high velocity in the direction of the indicating arrows the cans are directed endwise downwardly through the chutes 90 where they strike the turning pins 91.

The adjacent walls of the chutes are bulged or enlarged as shown at 97, thus providing ample room for the cans to turn so that their longitudinal axis will be at right angles to the line of travel as shown at 92. The cans discharge from the lower ends of the chutes 90 into troughs 98 and are propelled through these troughs in the direction of the indicating arrows by means of conveyors 99 mounted on pulleys 100 and 101. These pulleys are secured on shafts journaled transversely of the machine and the shaft carrying the pulley 101 is driven from shaft 86 through chain and sprocket drive indicated at 102. The speed of the conveyors 99 being the same as that of the conveyors 82 piling up of the cans as they discharge from the vertical turning chutes 90 is prevented. When the end of the troughs 98 is reached runways 103 direct the cans downwardly into the trough 30 and they are here engaged by the conveyor 26 which is maintained in elevated position as shown in Fig. 8. The open ends of the cans will thus tilt upwardly and they are finally separated as shown in Fig. 8 and directed into the chutes indicated at 40a and 43.

The modified form of the invention shown in Figs. 11 to 13 has proven exceedingly satisfactory as the separation of the cans shown at 84 in Fig. 11 gives each can ample opportunity to turn when striking the turning pins 91 before another can has time to drop down the chutes 90 and interfere with the turning movement.

The turning mechanism shown in Fig. 7, to-wit the pins 35, also functions properly when the horizontally disposed cans shown at 70 are sufficiently separated, but it does happen that the horizontally disposed cans are often so closely spaced on the conveyor 6 that they tend to interfere with the turning of the cans when they strike the turning pins 35. This difficulty has been entirely avoided as shown in the modified structure of Fig. 11 to 13, inclusive. Furthermore, by pivotally mounting the turning pins as shown in Fig. 12 denting or nicking of the can end edges is avoided. Again by referring to Fig. 11, it will be noted that the lower ends of the vertical chute 90 are provided with openings such as shown at 104. These openings permit the cans which drop endwise through the chute to pass through, but if the cans are properly turned by the pin 91 they roll over the opening 104 and thus discharge onto the conveyor 99. It may happen that a can might pass the turning pin 91 without engagement therewith, and it is only cans that so pass the pin that are discharged through the opening 104. Cans thus discharged are delivered to a cross conveyor, not shown, and are returned to the feed hopper and conveyor belt 16.

While certain features of the present invention are more or less specifically described, I wish it understood that various changes may be resorted to within the scope of the appended claims. Similarly, that the materials and finishes of the several parts employed may be such as the manufacturer may decide, or varying conditions or uses may demand.

Having thus described my invention, what I claim and desire to secure by Letters Patent is—

1. In a machine of the character described, a hopper into which cans are adapted to be dumped, means for removing the cans therefrom, a horizontally disposed conveyor adapted to receive the cans removed from the hopper, means co-operating with the conveyor whereby the cans are arranged thereon either in a horizontal position with their longitudinal axis parallel to the direction of travel of the conveyor or in a position where the cans stand vertically on the conveyor, deflecting means adjacent the end of the conveyor whereby the vertically positioned cans are removed, a runway to receive the cans removed, and means in the runway for turning the cans to a horizontal position.

2. In a machine of the character described, a hopper into which cans are adapted to be dumped, means for removing the cans therefrom, a horizontally disposed conveyor adapted to receive the cans removed from the hopper, a pair of rotating rollers disposed above the conveyor, one on each side thereof, said rollers receiving the cans removed from the hopper and depositing the cans on the conveyor either in a horizontal position with their longitudinal axis parallel to the direction of travel of the conveyor or in a position where the cans stand vertically on the conveyor, deflecting means adjacent the end of the conveyor whereby the vertically positioned cans are removed, a runway to receive the cans removed, and means in the runway for turning the cans to a horizontal position.

3. In a machine of the character described, a first conveyor and a second conveyor, said first conveyor carrying cans disposed vertically and also carrying cans lying horizontally with their longitudinal axis in the direction of travel of the first conveyor, means disposed between the two conveyors whereby the vertically disposed cans are tilted to a horizontal position and delivered to the second conveyor in that position with the longitudinal axis of the cans disposed at right angles to the path of travel of the second conveyor, and other means disposed between the conveyors whereby the horizontally disposed cans on the first conveyor are swung around and delivered to the second conveyor in a position where their longitudinal axis is disposed at right angles to the path of travel of the second conveyor.

4. In a machine of the character described, a conveyor having a plurality of cans arranged thereon in a substantially horizontal position with their longitudinal axis at right angles to the path of travel of the conveyor, said cans having open ends pointing in opposite directions but towards each other, means extending longitudinally of the conveyor for slightly elevating the open ends of the cans and for separating the cans having their open ends pointing in one direction from cans having their open ends pointing in the opposite direction, and means for reversing the position of said cans so that all cans will have their open ends pointing in the same direction.

5. In a machine of the character described, a conveyor having a plurality of cans arranged thereon in a substantially horizontal position with their longitudinal axis at right angles to the path of travel of the conveyor, said cans having open ends pointing in opposite directions, a cable in the conveyor for advancing the cans and for slightly elevating the open ends of the cans, means for separating the cans having their open ends pointing in one direction from cans having their open ends pointing in the oppposite direction and for removing the same from the conveyor, and means for removing the remaining cans, said means reversing their position end for end so that all cans will have their open ends pointing in the same direction.

6. In a machine of the character described, a hopper into which open ended cans are adapted to be dumped, means for removing the cans from the hopper, a conveyor to receive the cans, rotating rollers disposed parallel to the conveyor above the same and on each side thereof, said rollers positioning the cans delivered to the conveyor either vertically on the conveyor or horizontally on the conveyor with their longitudinal axis in the direction of travel of the conveyor, means for removing the vertically positioned cans from the conveyor, said means also tilting the cans from their vertical position to a horizontal position and delivering the cans in the horizontal position to a second conveyor with the longitudinal axis of the cans disposed at right angles to the direction of travel of said second conveyor, means for transferring the horizontally disposed cans on the first named conveyor to the second conveyor and for positioning the cans with their longitudinal axis at right angles to the direction of travel of the second conveyor, and means for removing the cans from said second named conveyor with the open ends of the cans pointing in the same direction.

7. In a machine of the character described, a hopper into which open ended cans are adapted to be dumped, means for removing the cans from the hopper, a conveyor to receive the cans, rotating rollers disposed parallel to the conveyor above the same and on each side thereof, said rollers positioning the cans delivered to the conveyor either vertically on the conveyor or horizontally on the conveyor with their longitudinal axis in the direction of travel of the conveyor, means for removing the vertically positioned cans from the conveyor, said means also tilting the cans from their vertical position to a horizontal position and delivering the cans in the horizontal position to a second conveyor with the longitudinal axis of the cans disposed at right angles to the direction of travel of said second conveyor, means for transferring the horizontally disposed cans on the first named conveyor to the second conveyor and for positioning the cans with their longitudinal axis at right angles to the direction of travel of the second conveyor, means on the second named conveyor for tilting the cans so that their open ends point upwardly, and means for removing all of the cans from said conveyor and for discharging them therefrom with their open ends all pointing in one direction.

8. In a machine of the character described, a trough having a bottom section and a pair of side sections, said trough adapted to receive a plurality of open ended cans with the longitudinal axis of the cans disposed at right angles to the longitudinal axis of the trough, and a single means extending from end to end of the trough substantially centrally thereof and slightly elevated with relation to the bottom section, said means supporting the open ends of the cans with the open ends pointing in opposite directions but towards each other, and said means also imparting movement to the cans along the trough.

9. In a machine of the character described, a trough having a bottom section and a pair of side sections, said trough adapted to receive a plurality of open ended cans with the longitudinal axis of the cans disposed at right angles to the longitudinal axis of the trough, a single means extending from end to end of the trough substantially centrally thereof and slightly elevated with relation to the bottom section, said means supporting the open ends of the cans with the open ends pointing in opposite directions but towards each other, and said means also imparting movement to the cans along the trough, a pair of runways connected with the trough, one runway receiving the cans pointing in one direction and the other receiving the cans pointing in the opposite direction, and means in the last named runway for reversing the position of the cans so that they will discharge with their open ends pointing in the same direction as the cans discharging from the first named runway.

10. In a machine of the character described, a trough having a bottom section and a pair of side sections, a conveyor cable disposed substantially centrally of the trough and slightly elevated with relation to the bottom section, said trough and conveyor adapted to receive and convey a plurality of open ended cans with the longitudinal axis of the cans disposed at right angles to the path of travel of the conveyor, said cans having their open ends pointing in opposite directions but towards each other, the open ends of the cans being supported by the conveyor cable and being maintained in a slightly elevated position with relation to the closed ends of the cans.

11. In a machine of the character described, a trough having a bottom section and a pair of side sections, a conveyor cable disposed substantially centrally of the trough and slightly elevated with relation to the bottom section, said trough and conveyor adapted to receive and convey a plurality of open ended cans with the longitudinal axis of the cans disposed at right angles to the path of travel of the conveyor, said cans having their open ends pointing in opposite directions but towards each other, the open ends of the cans being supported by the conveyor cable and being maintained in a slightly elevated position with relation to the closed ends of the cans, means for separating the cans pointing in opposite directions into two groups, and means for reversing the cans end for end in one group so that the cans in both groups will have their open ends pointing the same direction.

12. In a machine of the character described, a first conveyor and a second conveyor, said first conveyor carrying open ended cans disposed vertically and also open ended cans lying horizontally with their longitudinal axis in the direction of travel of the conveyor, means adjacent the discharge end of the first named conveyor for removing the vertically disposed cans, means cooperating therewith for tilting the cans to a horizontal position and for delivering the cans in that position to the second named conveyor with the longitudinal axis of the cans at right angles to the direction of travel of the second conveyor, a third conveyor to which the horizontally positioned cans on the first conveyor are delivered, said third conveyor travelling at a greater speed than the first conveyor so as to increase the spacing between the horizontally positioned cans delivered thereto, means cooperating with the third conveyor for turning the horizontally positioned cans having their longitudinal axis in the direction of travel on the first and third conveyor to a horizontal position with their longitudinal axis at right angles to the path of travel, and means for delivering the cans in that position to the second conveyor.

13. In a machine of the character described, a first conveyor and a second conveyor, said first conveyor carrying open ended cans disposed vertically and also open ended cans lying horizontally with their longitudinal axis in the direction of travel of the conveyor, means adjacent the discharge end of the first named conveyor for removing the vertically disposed cans, means cooperating therewith for tilting the cans to a horizontal position and for delivering the cans in that position to the second named conveyor with the longitudinal axis of the cans at right angles to the direction of travel of the second conveyor, a third conveyor to which the horizontally positioned cans on the first conveyor are delivered, said third conveyor travelling at a greater speed than the first conveyor so as to increase the spacing between the horizontally positioned cans delivered thereto, means cooperating with the third conveyor for turning the horizontally positioned cans having their longitudinal axis in the direction of travel on the first and third conveyor to a horizontal position with their longitudinal axis at right angles to the path of travel, means for delivering the cans in that position to the second conveyor, said second conveyor carrying cans horizontally positioned with their longitudinal axis at right angles to the direction of travel but with the open ends of the cans pointing in opposite directions, a pair of runways connected with the discharge end of the second named conveyor, and means for directing the open ended cans pointing in one direction in one runway and the open ended cans in the other direction in the other runway.

14. In a machine of the character described, a first conveyor and a second conveyor, said first conveyor carrying open ended cans disposed vertically and also open ended cans lying horizontally with their longitudinal axis in the direction of travel of the conveyor, means adjacent the discharge end of the first named conveyor for removing the vertically disposed cans, means cooperating therewith for tilting the cans to a horizontal position and for delivering the cans in that position to the second named conveyor with the longitudinal axis of the cans at right angles to the direction of travel of the second conveyor, a runway into which the horizontally positioned cans on the first conveyor are discharged, an obstruction in said runway engageable with the ends of the cans and turning the cans from a horizontal position with their longitudinal axis in the direction of travel to a horizontal position with their longitudinal axis at right angles to the direction of travel, and means cooperating therewith for delivering the cans in that position to the second named conveyor.

ADOLF H. NELSON.